United States Patent

Gretz

[11] Patent Number: 6,043,432
[45] Date of Patent: Mar. 28, 2000

[54] SNAP IN CABLE CONNECTOR

[75] Inventor: Thomas J. Gretz, Clarks Summit, Pa.

[73] Assignee: Arlington Industries, Inc., Scranton, Pa.

[21] Appl. No.: 09/007,532

[22] Filed: Jan. 15, 1998

[51] Int. Cl.[7] .................................................. H02G 3/18
[52] U.S. Cl. ...................... 174/65 R; 174/167; 439/460; 16/2.1; 285/921; 29/450
[58] Field of Search .......................... 174/65 R, 65 SS, 174/65 G, 152 G, 153 G, 167, 153 R; 439/439, 411, 460, 98; 285/194, 921, 154.1, 140.1; 16/2.1; 29/450

[56] References Cited

U.S. PATENT DOCUMENTS

| | | | |
|---|---|---|---|
| 3,858,151 | 12/1974 | Paskert | 339/14 R |
| 3,904,812 | 9/1975 | Daffron | 174/52.3 |
| 3,980,325 | 9/1976 | Robertson | 285/249 |
| 4,012,578 | 3/1977 | Moran | 174/51 |
| 4,468,535 | 8/1984 | Law | 174/65 R |
| 4,494,779 | 1/1985 | Neff | 285/159 |
| 4,619,332 | 10/1986 | Sheehan | 174/65 R |
| 4,711,472 | 12/1987 | Schnell | 285/162 |
| 4,739,126 | 4/1988 | Gutter et al. | 174/65 SS |
| 4,773,280 | 9/1988 | Baumgarten | 403/197 |
| 4,880,387 | 11/1989 | Stikeleather | 439/98 |
| 4,990,721 | 2/1991 | Sheehan | 174/65 R |
| 5,068,496 | 11/1991 | Favalora | 174/65 R |
| 5,072,072 | 12/1991 | Bawa et al. | 174/65 SS |
| 5,200,575 | 4/1993 | Sheehan | 174/65 R |
| 5,266,050 | 11/1993 | O'Neil | 174/65 R |
| 5,373,106 | 12/1994 | O'Neil et al. | 174/65 R |
| 5,422,437 | 6/1995 | Schnell | 174/65 R |

*Primary Examiner*—Kristine Kincaid
*Assistant Examiner*—Dhiru R. Patel

[57] ABSTRACT

A snap in locking cable connector is composed of two mating pieces that snap together and provide a connector for armored or metal clad electrical conductors. One piece includes a die cast member including a smooth outer cylindrical section having an inner diameter that may accommodate a spring steel adaptor with flanges to hold the spring steel adaptor in place. The spring steel adaptor is used in conjunction with an electrical junction box to fix the location of the locking cable connector with respect to the junction box. Another piece includes a spring steel locking ring provided to receive an armored cable and lock into the die cast member. The spring steel locking ring has tangs allowing unidirectional insertion into the die cast member and restricting withdrawal motion from the die cast member. The spring steel locking ring also includes oppositely directed tangs to permit reception of the armored cable in one direction and restrict its movement in the reverse direction.

7 Claims, 3 Drawing Sheets

SNAP IN CABLE CONNECTOR

BACKGROUND OF THE INVENTION

1. Field of the Invention

The present invention relates to cable terminations and more particularly to locking cable terminations which snap into place and require no screws or twisting for locking.

2. Related Prior Art

There has been an extensive number of various types of cable connectors that have been designed since the initial use of electricity prior to the turn of the century. Many types are still in use in some form. The most common initial design that is in use today is a form that was first patented in the mid-twenties. This form includes a screw that is tightened once the cable or electrical wire is in place. The electrical cable is fed into a hole or slot in a junction box through an oversized fitting that has provision for receiving a screw. In the early design the screw was configured to press directly against the electrical cable. This presented problems with the screw penetrating the insulation covering on the wire.

Presently, the screw type securement is one where the screw tightens a clamp that presses against the wire covering. The screw is normally fitted into the wall of a junction box and pulls the clamp closer to the wall as the screw is tightened. These clamps are designed so that even at their tightest when the screw pulls a portion of the clamp against the wall, there is a space between the portion of the clamp pressing against the wire and the wall of the junction box. In more recent years, there have several patents that involve snap type fittings, of which the following patents are representative.

U.S. Pat. No. 3,858,151, titled "Flexible Conduit Connector", issued to J. H. Paskert, relates to a connector for securing a helically grooved flexible electrical conduit with a junction box that is formed as a one piece metal clip. The clip has a tubular body with tabs and barbs which engage the helical groove in the conduit to prevent the conduit from being pulled out of the clip and to electrically interconnect the clip and conduit. The barbs and tabs are disposed along a common helical path to facilitate turning or screwing of the clop onto one end of the conduit. A collar on the inner end of the clip encloses the end of the conduit to protect wires in the conduit against engagement with any burrs which may ne formed on the end of the conduit. Resiliently deflectable retaining arms and flanges clampingly engage a wall of the junction box to hold the clip and conduit in place. The retaining arms are provided with pointed end portions which are pressed against the wall of the junction box to electrically interconnect the clip and junction box.

U.S. Pat. No. 4,012,578, titled "One Piece Connector For Flexible Conduit", issued to T. M. Moran et al., relates to a one piece connector clip for securing a helically grooved flexible electrical conduit within generally round apertures in a junction box. The body of the clip comprises a plurality of generally flat sides and is provided with tabs which engage the helical groove in the conduit to prevent the conduit from being pulled out of the clip and to electrically interconnect the clip and conduit. A collar on the inner end of the clip encloses the end of the conduit to protect the wires contained therein against any burrs which may be present on the end of the conduit. Resiliently deflectable retaining arms and flanges clampingly engage a wall of the junction box to hold the clip and conduit in place and to electrically interconnect the clip and the junction box. In one embodiment of the invention, the body of the clip has a generally square cross-sectional configuration, in another embodiment, the body has a generally truncated equilateral triangular shape, while in still another embodiment the body has a generally hexagonal shape.

U.S. Pat. No. 4,880,387, titled "Connector For Flexible Electrical Conduit", issued to Allan Stikeleather et al., relates to a connector for joining flexible electrical conduit to a housing such as a junction box, fixture or the like which is formed cylindrically from light metal and includes relatively flexible arms depending from a relatively stiff face portion, retaining members flaring from and extending for a substantial portion of the length of the flexible arms. Multiple barbs are formed on the flexible arms to engage the conduit and flanges are formed at the extremity of the flexible arms to cooperate with the retaining members to clamp the connector to the housing.

U.S. Pat. No. 5,422,437, titled "Electrical Connector Assembly", issued to Kenneth Schnell, relates to an electrical connector assembly for coupling non-metallic electrical conduit to an electrical box via a snap fit. The electrical connector assembly includes a snap nut adaptor with an annular groove at one end forming a first mating member, and a conduit connector with resilient latch tabs forming a second mating member. Upon inserting the snap nut adaptor through a hole or knockout opening in an electrical box, the conduit connector is securely coupled thereto by inserting it over the snap nut adaptor until the latch tabs engage the annular groove via a snap fit.

SUMMARY OF THE INVENTION

The present invention provides a snap in locking cable connector composed of three mating pieces that snap together and provide a connector for helically wound armored or metal clad electrical conductors. A spring steel adaptor is used in conjunction with an electrical junction box to fix the location of the locking cable connector with respect to the junction box. A first piece of the snap in locking cable connector is a die cast member including at the inbound end a smooth outer cylindrical section, having an outer diameter with flanges that accommodates a spring steel adaptor. Another piece is a spring steel locking ring provided to receive a helically wound shielded cable and inserted and located into the outer end of the die cast member. The locking ring has tangs which allow insertion into the die cast member but restricts withdrawal from the die cast member. The locking ring also has oppositely directed tangs to receive the armored cable and restrict its movement in a reverse direction.

The die cast member may have flat surfaces around its periphery forming a hexagon on one of the flanges to allow wrench tightening or loosening for making minor adjustments in the positioning of the armored cable in the member once the armored cable is inserted into the steel locking ring. Rotating the die cast member in one direction will pull the armored cable and advance it further into the member.

The spring steel locking ring has a cut out section to permit slight compression so that the locking ring may be easily inserted into the die cast member. Once inserted, the locking ring is able to expand to the full inner diameter of the die cast member to provide a tight fit.

DESCRIPTION OF THE PREFERRED EMBODIMENT

A continual problem in building construction is the problem of running armored cable for electrical connections. Many connectors require that there exist enough room within the junction box to permit insertion of a screw driver to tighten the cable and fix its position with respect to the junction box. Still other connectors can fix the position of the cable with respect to the junction box. However, once the connection is made, the cable cannot be backed out without the connection to the junction box being taken apart, which may not always be done easily.

In practicing the present invention, a three piece snap in cable connector is configured for use with a helically wound cable that locks into the junction box. The snap in cable connector is arranged to grip the helical grooves in an armored cable securely to lock it in position with respect to the cable connector.

Figures 1, 2:
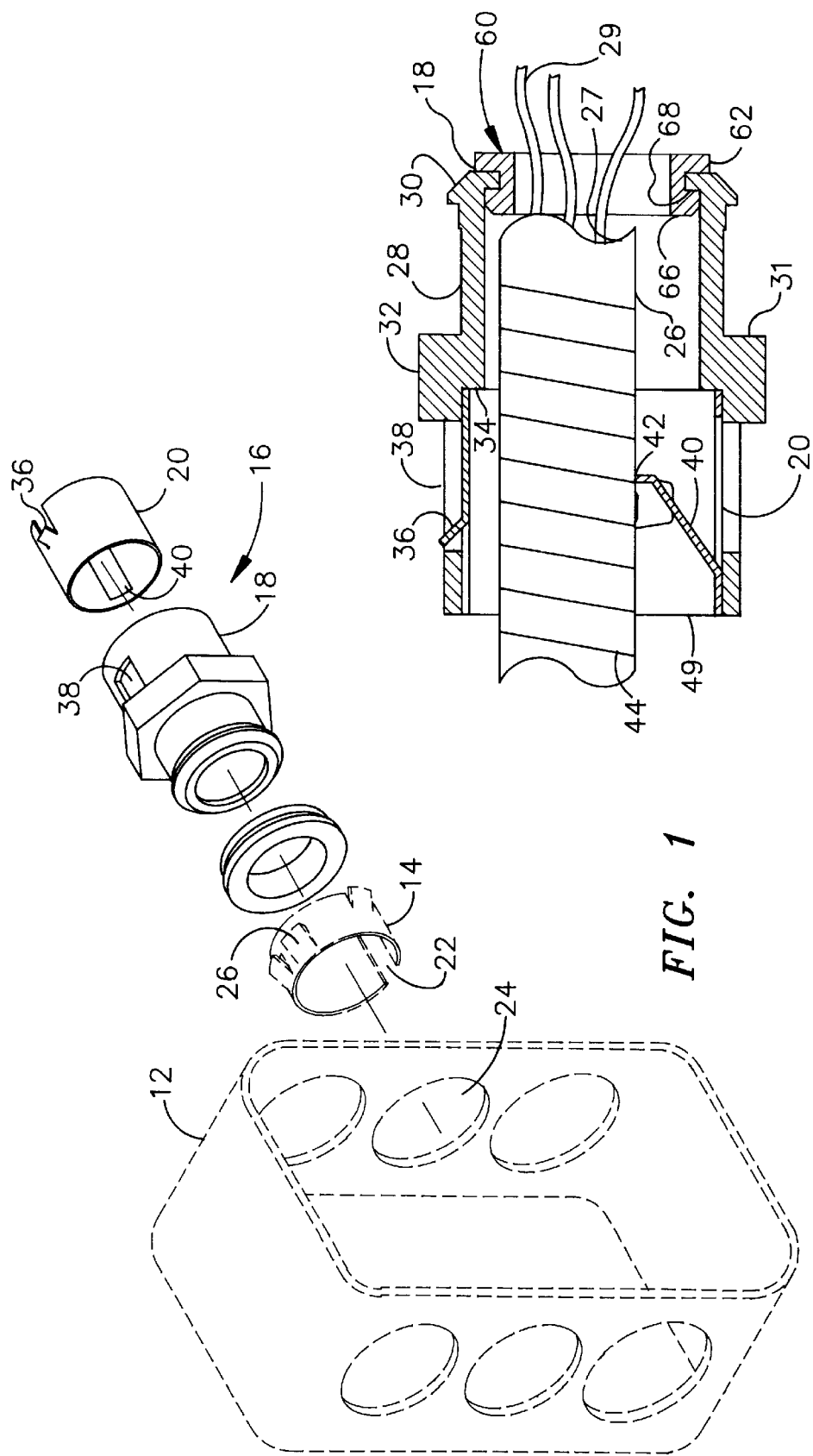
FIG. 1 is an exploded view of a junction box, spring steel adaptor and a snap in cable connector.
FIG. 2 is a sectional view of a snap in cable connector having a die cast member and a spring steel locking ring.

Referring now to FIG. 1, an exploded view of a junction box 12, a snap in cable connector 16 with first spring steel adapter or portion 14, a die cast member 18 and a spring steel locking ring 20 is illustrated. Spring steel adaptor 14 includes a slot 22 to permit expansion prior to being fitted over the reduced diameter area 28. Adaptor 14 fits into aperture 24 of junction box 12. Adaptor 14 also includes a plurality of tangs 15 to prevent removal of adaptor 14 once inserted into aperture 24. A more detailed operation of adaptor 14 may be found in U.S. Pat. No. 5,373,106, "Quick-Connect Fitting For Electrical Junction Box", assigned to the same assignee as the present invention and is incorporated herein by reference in its entirety.

FIG. 2 is a cross-sectional view of cable connector 16 illustrating the interconnection of die cast member 18 and second spring steel locking ring or portion 20 and the locking function of spring steel locking ring 20 around an armored cable 26.

Die cast member 18 is illustrated as having a reduced diameter area 28 for receiving adaptor 14 at a leading end. A lip 30 prevents adaptor 14 from slipping out once inserted. Lip 30 has a slight incline to permit insertion into aperture 24 of junction box 12. On the other side of area 28 is a perpendicular face 31 as part of an enlarged hexagonal section 32 positioned on the central portion between the first spring steel portion 14 and the second spring metal portion 20. The diameter of face 31 is greater than the diameter of lip 30 to prevent over insertion into aperture 24. Die cast member 18 with adaptor 14 can be inserted into aperture 24 only up to the face 31 of section 32. Section 32 with its flat parallel surfaces forms an hexagon shape when viewed from the end. When steel locking ring 20 is inserted at the trailing end with its cable gripping tangs, this hexagonical shape allows gripping with a standard fixed or adjustable wrench to draw armored cable 26 into the steel locking ring 20. In this manner, minor adjustments to the position of armored cable 26 can be effected. The inner diameter of die cast member reduces on the inside of section 32 to form a face or shoulder 34 to restrict insertion of steel locking ring 20. Thus, the inside diameter of the locking ring is approximately the same as the inside diameter of the shoulder 34.

Steel locking ring 20 is illustrated as inserted into die cast member 18 with a first tang 36 in a corresponding opening 38 in die cast member 18. As is seen, the spring steel tang 36 has an outward extending angle which permits the tang to be depressed inward as the steel locking ring is inserted into the outer aperture 49 of the member 18, yet spring outward into openings 38 and 38A to prevent withdrawal. Also illustrated is cable tang 40 in steel locking ring 20, gripping the bottom of the external helical recesses of armored cable 26 at point 42 in helical groove 44. Shoulder 34 of die cast member 18 is positioned such that the end of tang 36 barely clears the edge of opening 38 before steel snap locking ring 20 reaches a place where it cannot be inserted further.

As is seen in FIG. 2, the armored cable 26 is cut at the end 27 of the connector which is just inside the inner end. The wires 29 are connected on the inside of the junction box. Also shown in FIG. 2 is a plastic grommet 60 which has a flange 62 preventing full insertion into the inner end of the connector. The grommet has a reduced diameter section 64 and latch 66 which fit over a ridge 68 on the connector. The grommet can be pushed into the connector until the latch 66 catches on the ridge 68. The grommet prevents chafing of the wires 29 and helps retain the armored cable 26 in the connector.

Figure 3:
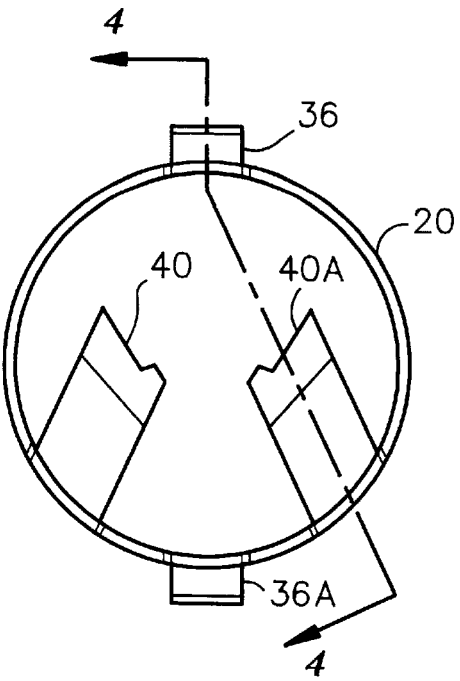
FIG. 3 is a sectional view of the spring steel locking ring of FIG. 2.

Referring now to FIG. 3, an end view of steel locking ring 20 is illustrated as having two tangs 36 and 36A to provide locking stability when inserted into die cast member 18. It is to be noted that tangs 36 and 36A have angled outward surfaces and relatively flat axial surfaces since the force that needs to be exerted on die cast member 18 is in direct line with the direction of insertion and removal. Generally cylindrical spring steel locking ring 20 is provided to receive armored cable 26 and lock it into die cast member 18. Steel locking ring 20 has a first set of tangs 36 and 36A to allow insertion into die cast member 18 while restricting withdrawal of locking ring 20 from die cast member 18. The first set of tangs 36 and 36A includes a pair of tangs located at one end of locking ring 20 with the pair of tangs spaced on opposite side from each other. In an alternate arrangement, the first set of tangs includes three tangs (not shown) located at one end of locking ring 20. The three tangs may be equally spaced along the circumference of the generally cylindrical spring steel locking ring 20.

Also illustrated are two cable gripping tangs 40 and 40A for securely holding armored cable 26 in position. The surfaces of tangs 40 and 40A have a relatively flat axial surface with the tangs angled inward toward the inner end of the member 18. As is seen, the tangs 36, 36A, 40 and 40A are lanced from the cylindrical wall of the locking ring 20. The inside end 41 of cable gripping tangs 40 and 40A are bent on a radial direction and jagged with points since the force that needs to be exerted is helical or twisting in nature and a flat surface would slide along groove 44 of armored cable 26. In FIG. 3, steel locking ring 20 shows the second set of tangs oppositely directed from the first set of tangs to receive armored cable 26 and prevent its removal in a reverse direction. The second set of tangs includes a pair of tangs 40 and 40A, centrally located from the ends of locking ring 20, the pair of tangs 40 and 40A are spaced one hundred twenty degrees apart from each other along the internal circumference of locking ring 20. This arrangement pushes armored cable 26 against one side of steel locking ring 20 when there is an attempt to pull armored cable 26 from snap in cable connector 16, reducing the effective diameter of steel locking ring 20 to the diameter of armored cable 26. In an alternate embodiment, the second set of tangs may include three tangs (not shown) centrally located in locking ring 20, the three tangs may be spaced one hundred twenty degrees apart from each other along the internal circumference of locking ring 20. In this arrangement the tangs evenly distribute the force that may be exerted to remove the cable around the outside of armored cable 26, with the tangs digging into groove 44.

Figure 4:
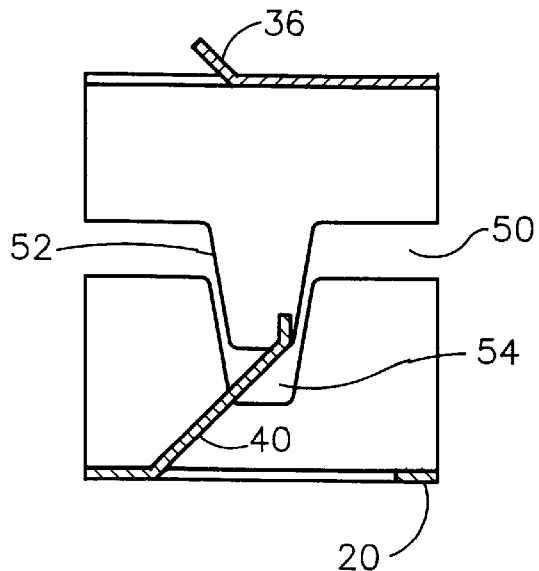
FIG. 4 is a side sectional view of the spring steel locking ring taken along lines 4—4 of FIG. 3.

FIG. 4 illustrates an arrangement of the steel locking ring having a slot 50 with an offset piece or tongue 52 on one side of slot 50 that fits into a concomitant cutout 54 on the other side of slot 50. Slot 50 permits compression of steel locking ring 20 to an outer diameter smaller than the inner diameter of die cast member 18. This arrangement allows easy insertion of steel locking ring 20 into die cast member 18 and expansion of the outer diameter of steel locking ring 20 to fit tightly into the inner diameter of die cast member 18. Slot 50 with offset piece 52 on one side with concomitant cutout 54 on the other side assures that tangs 36 and 36A of steel locking ring 20 remain aligned with openings 38 and 38A of die cast member 18. Without offset piece 52 and cutout 54, compression of steel locking ring 20 permitted by slot 50 may result in a sliding of one side of slot 50 with respect to the other or deforming a of locking ring 20 so that one tang, for example, tang 36, may align with opening 38 while due to deformation, tang 36A is still outside die cast member 18 and does not align with opening 38A.

Figure 5:
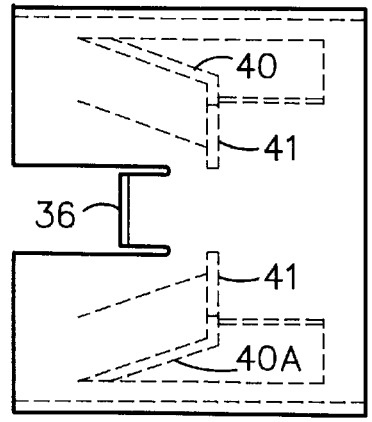
FIG. 5 is a top view of the spring steel locking ring of FIG. 4.

FIG. 5 is a top view of steel locking ring 20 of FIG. 3 with cable holding and tangs 40 and 40A shown in phantom with inside end 41 shown. As can be seen, tang 40 is displaced from tang 40A approximately one hundred twenty degrees along the inner circumference of steel locking ring 20.

Figure 6:
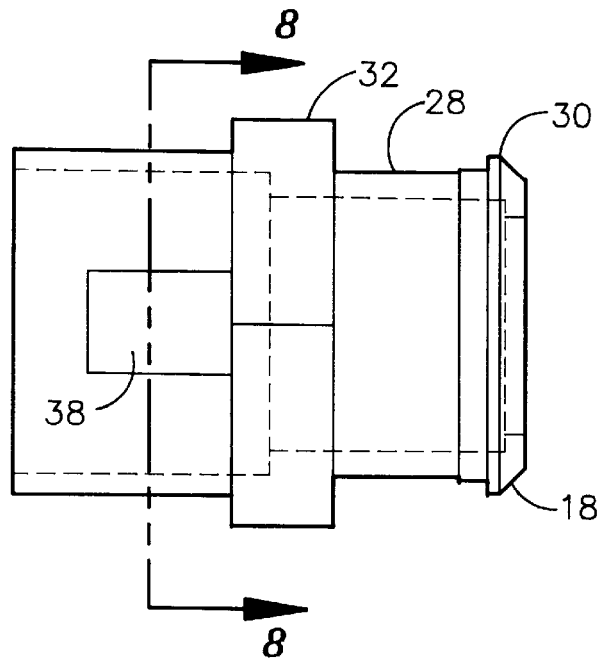
FIG. 6 is a side view of the die cast member of FIG. 2.

Referring now to FIG. 6, a side view of die cast member 18 is illustrated as having reduced diameter area 28 for receiving adaptor 14. Reduced area 28 is defined by lip 30, which prevents adaptor 14 from slipping out once inserted, and enlarged flat face 31. As stated previously, lip 30 has a slight incline to permit insertion into aperture 24 of junction box 12. Also previously stated, face 31 is greater that the diameter of lip 30 to prevent over insertion into aperture 24. As can be seen by a comparison of the diameters of lip 30 and face 31, die cast member 18 with adaptor 14 can be inserted into aperture 24 only up to the edge of section 32.

Figure 7:
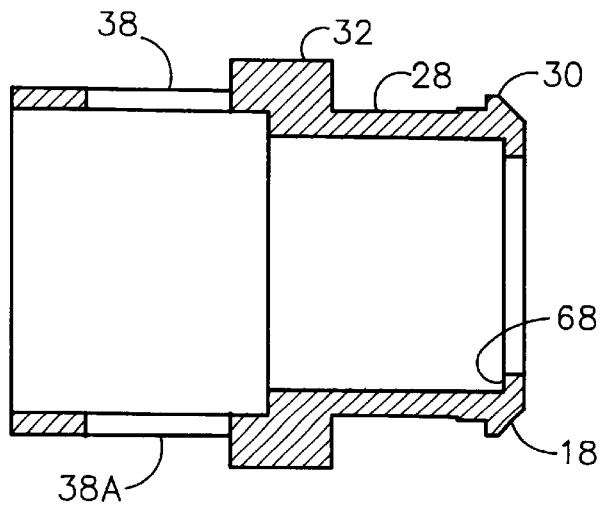
FIG. 7 is a side sectional view of the die cast member of FIG. 6.

FIG. 7 is a sectional view of the die cast member 18 illustrating first opening 38 to receive tang 36 of steel locking ring 20 and a second opening 38A to receive tang 36A of steel locking ring 20.

Figure 8:
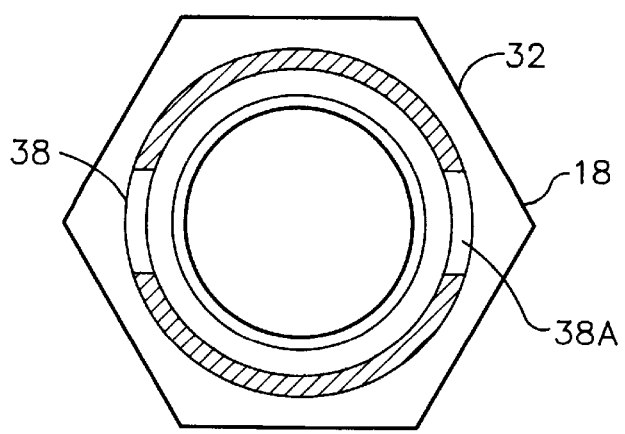
FIG. 8 is an end view of the die cast member of FIG. 6 taken along lines 8—8.

FIG. 8 is an end view of die cast member 18 illustrated in FIG. 6. As described previously and illustrated more clearly in FIG. 8, section 32 with its flat parallel surfaces forms an hexagon shape when viewed from the end. This shape is provided to allow gripping with a standard fixed or adjustable wrench. By rotating the wrench, (not shown) armored cable 26 may be drawn into the locking ring 20. In this manner, minor adjustments to the position of armored cable 26 can be performed.

A snap in locking cable connector has been described that is composed of three mating pieces that snap together and provide a connector for armored or metal clad electrical conductors. One piece includes a die cast member having a smooth outer cylindrical section. This section accommodates a spring steel adaptor. The smooth cylindrical section has flanges at each end defining to hold the spring steel adaptor in place. The spring steel adaptor is used in conjunction with an electrical junction box to fix and lock in the locking cable connector with respect to the junction box. Another piece includes a spring steel locking ring provided to receive a helical shielded or armored cable. The spring steel locking ring locks into the die cast member. The spring steel locking ring has tangs allowing unidirectional insertion into the die cast member and restricting withdrawal from the die cast member. The spring steel locking ring also includes oppositely directed cable gripping tangs to permit reception of the armored cable in one direction and restrict its movement in the reverse direction.

Thus, the use of the connector permits a simple assembly by snapping the helical armored cable into the connector and snapping the connector and cable to the junction box. The connector can be slightly rotated to take up any slack with the armored cable if the inside ends 41 of the tangs rest at the bottom of a grove which requires some tightening.

While there has been illustrated and described a particular embodiment of the present invention, it will be appreciated that numerous changes and modifications will occur to those skilled in the art, and it is intended in the appended claims to cover all those changes and modifications which fall within the true spirit and scope of the present invention.

I claim:

1. A snap in locking helical armored or metal clad cable connector configured for use with a spring steel adaptor to join to an electrical junction box to fix the location of the locking cable connector with respect to the junction box, the locking cable connector having mating pieces that snap together to connect the locking cable connector for helically armored or metal clad cable to an aperture in an electrical junction box comprising:

a first piece including a die cast member with an opening and a smooth inboard cylindrical section having a diameter to include and accommodate a first spring steel adaptor;

a generally cylindrical second spring steel locking ring to receive said cable and lock said cable into the trailing end of said die cast member, said locking ring having a first set of tangs allowing insertion of said locking ring into said openings in said die cast member but restricting withdrawal motion from said die cast member and having a second set of cable gripping tangs oppositely directed to receive said cable and restrict its movement in a reverse direction; and said first piece having an enlarged section separating said first spring steel adaptor located on said inboard cylindrical section from said second spring steel locking ring located on said trailing end.

2. The snap in locking cable connector configured for use with a spring steel adaptor according to claim 1 wherein said first set of tangs includes a pair of tangs located at one end of said locking ring, said pair of tangs spaced on opposite sides from each other.

3. The snap in locking cable connector configured for use with a spring steel adaptor according to claim 1 wherein said first set of tangs includes three tangs located at one end of said locking ring, said three tangs equally spaced along the circumference of said locking ring.

4. The snap in locking cable connector configured for use with a spring steel adaptor according to claim 1 wherein said second set of tangs includes a pair of tangs centrally located in said locking ring, said pair of tangs spaced one hundred twenty degrees apart from each other along an internal circumference of said locking ring.

5. The snap in locking cable connector configured for use with a spring steel adaptor according to claim 1 wherein said second set of tangs includes three tangs centrally located in said locking ring, said three tangs spaced one hundred twenty degrees apart from each other along an internal circumference of said locking ring.

6. A method for fixing the location of a locking cable connector, configured for use with a spring steel adaptor, with respect to an electrical junction box, the locking cable connector having a first piece and a second piece that snap together to connect the locking cable connector for armored or metal clad electrical conductors to an aperture in the electrical junction box, said method comprising:

providing said first piece with a die cast member including an enlarged section separating the leading end from the trailing end and having a smooth outer central section located at the leading end having a diameter that may accommodate a spring steel adaptor and greater outer diameters to hold said spring steel adaptor in place on said leading end at said central section;

providing said second piece with a generally cylindrical spring steel locking ring having a first set of tangs for resisting withdrawal and having a second set of tangs oppositely directed to receive the armored cable;

inserting said locking ring into a cylindrical opening in the trailing end of said die cast member;

restricting withdrawal motion of said locking ring from said die cast member;

receiving an armored or metal clad cable in said locking ring; and preventing removal of said armored or metal cable in a reverse direction in said locking ring.

7. The method according to claim 6 wherein said restricting withdrawal step includes:

providing three said second set of tangs includes tangs located at one end of said locking ring, said three tangs equally spaced along the circumference of said locking ring; and distributing a force applied for withdrawal of said locking ring equally to three points along said locking ring.

* * * * *